Figure 2:
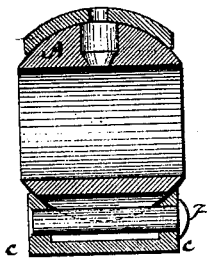

C. H. Perkins,
Pitmen.
No. 109,047.   Patented Nov. 8, 1870.

WITNESSES.  Peter F Hughes   Charles H. Perkins   INVENTOR.
Benj. F. Thurston

UNITED STATES PATENT OFFICE.

CHARLES H. PERKINS, OF PROVIDENCE, RHODE ISLAND, ASSIGNOR TO PERKINS SHEET-IRON COMPANY, OF SAME PLACE.

Letters Patent No. 109,047, dated November 8, 1870.

IMPROVEMENT IN PITMEN.

The Schedule referred to in these Letters Patent and making part of the same.

*To all whom it may concern:*

Be it known that I, CHARLES H. PERKINS, of the city and county of Providence, in the State of Rhode Island, have invented a new and useful improved Pitman for Scythe of Mowing-Machine; and I do hereby declare that the following specification, taken in connection with the drawing making a part of the same, is a full, clear, and exact description thereof.

Figure 1:
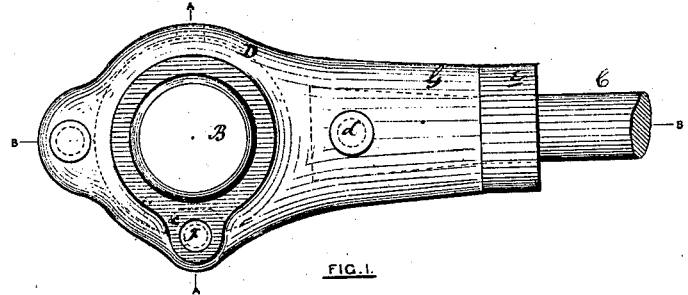
Figure 3:
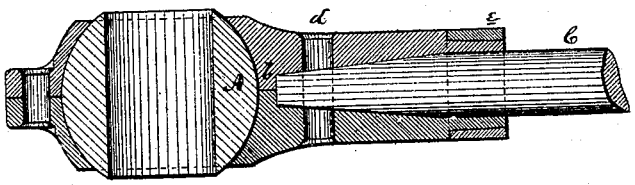
Figure 5:
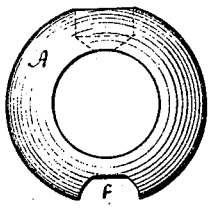
Figure 4:
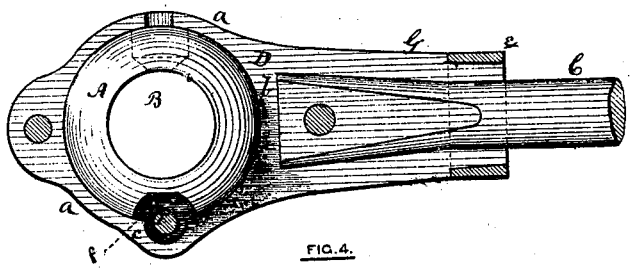
Figure 6:
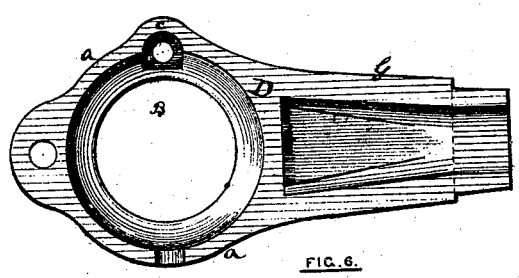
Figure 7:

Figure 1 is a top view.
Figure 2 is a transverse section on the line A A.
Figure 3 is a longitudinal section on the line B B.
Figure 4 is a view with upper plate removed.
Figure 6 is a view of the under side of the plate.
Figures 5 and 7 are detailed parts.

My improvement consists—

First, in the employment of a ball-and-socket joint, having a limited range of movement, in combination with the journal-bearing of the wrist-pin of the operating-crank for the knife of a harvester, as a means for permitting the angular movement necessary for the pitman connecting the crank with the knife; and, Second, in the means for connecting the pitman-rod with the socket of the ball-joint referred to.

A in the several figures is a spherical ball, having a hole, B, through its axis, for a journal-bearing for the crank-pin which actuates the knife.

C is the pitman-rod.

The socket D of the ball A is made in halves, a a', which, when placed face to face and bolted together, form a hollow sphere, which is occupied by the ball A. While some angular movement is required of the pitman, which makes it advisable that this description of joint-connection should be used between the pitman and the wrist-pin of the actuating-crank, it is desirable that the crank-pin should work in the bearing B of the ball instead of the ball revolving in its socket. Accordingly, its movement in the direction in which the crank revolves is entirely restrained, while a limited angular movement is permitted to the socket connected with the pitman-rod. This is effected by cutting a deep groove or channel, f, in the side of the ball, and inserting a rivet-bolt, F, (considerably smaller in diameter than the width of the groove,) through ear-pieces, e, in the halves of the socket. The relation which the rivet-bolt holds to the groove in the ball is shown at fig. 4, from which it is apparent that, while the ball cannot turn with the crank-pin, a limited angular movement is permitted to the socket on the ball.

Each half of the shank G of the socket is cast with a dovetail recess, semicircular at the front end, and widening and flattening, and becoming shallower as it approaches its end at b. The pitman-rod, which is made of round iron, is flattened and widened at its end, as seen at figs. 3 and 4, to fit the dovetail cavity formed by the halves of the socket.

It is quite evident that, when the halves of the socket are bolted together and the end of the pitman-rod, so shaped, is inserted as shown in the figures, it will be firmly attached to the socket even without the aid of a holding-pin, d.

The end of the halves of the shank of the socket should be clamped together by a ferrule, e, driven onto a tapering seat.

I do not claim a ball-and-socket joint as a means of connecting the pitman for the knife of a mowing-machine to the operating-crank; but What I do claim as my invention, and desire to secure by Letters Patent, is—

1. The combination of the globular recessed socket D, rivet-bolt F, and the ball B, fitted to receive a crank-pin, and provided with the slot f, and arranged with relation to the bolt F, substantially as described, for the purposes specified.

2. In combination with a pitman-rod having a flattened and widened end, the shank G, provided with corresponding dovetailed recesses, substantially as shown and described.

CHARLES H. PERKINS.

Witnesses:
 PETER F. HUGHES,
 BENJ. F. THURSTON.